US008837324B2

(12) United States Patent
Chow et al.

(10) Patent No.: US 8,837,324 B2
(45) Date of Patent: Sep. 16, 2014

(54) METHODS FOR ACCESSING END-TO-END BROADBAND NETWORK VIA NETWORK ACCESS SERVER PLATFORM

(75) Inventors: Albert T. Chow, Hillsdale, NJ (US); Kenny X. Huang, Somerset, NJ (US); Jinman Kim, Chatham, NJ (US); Robert R. Miller, Convent Station, NJ (US); Wenchu Ying, Cedar Knolls, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 271 days.

(21) Appl. No.: 12/839,631

(22) Filed: Jul. 20, 2010

(65) Prior Publication Data

US 2011/0013620 A1 Jan. 20, 2011

Related U.S. Application Data

(63) Continuation of application No. 10/189,776, filed on Jul. 8, 2002, now Pat. No. 7,792,053.

(51) Int. Cl.
*H04L 12/28* (2006.01)
*H04L 12/66* (2006.01)
*H04W 24/00* (2009.01)
*G06F 15/16* (2006.01)

(52) U.S. Cl.
CPC .................................. *H04L 12/2872* (2013.01)
USPC ......... 370/254; 370/401; 455/456.3; 709/219

(58) Field of Classification Search
None
See application file for complete search history.

(56) References Cited

U.S. PATENT DOCUMENTS

| 4,594,477 | A | * | 6/1986 | Noirot ........................... 379/225 |
| 5,173,933 | A | * | 12/1992 | Jabs et al. ..................... 455/405 |
| 5,680,439 | A | | 10/1997 | Aguilera et al. |
| 6,081,520 | A | * | 6/2000 | Kaschulla et al. ............ 370/357 |
| 6,119,001 | A | | 9/2000 | Delis et al. |
| 6,188,683 | B1 | * | 2/2001 | Lang et al. ..................... 370/352 |
| 6,215,790 | B1 | | 4/2001 | Voit et al. |
| 6,249,814 | B1 | | 6/2001 | Shaffer et al. |
| 6,253,081 | B1 | | 6/2001 | Koster |
| 6,308,203 | B1 | | 10/2001 | Itabashi et al. |

(Continued)

FOREIGN PATENT DOCUMENTS

DE 3428237 A1 2/1986

OTHER PUBLICATIONS

U.S. Official Action dated Mar. 24, 2006 in U.S. Appl. No. 10/163,500.

(Continued)

*Primary Examiner* — Gregory Sefcheck
(74) *Attorney, Agent, or Firm* — Hartman & Citrin LLC

(57) ABSTRACT

A system is described for providing personalized network access and services in a distributed end-to-end broadband transport network having a telecommunication device used by a user having a unique personal identifier, a premises-based broadband access agent (BAA), the BAA connected to and in communication with the telecommunication device, a switch specific to an underlying transport medium, the switch connected to and in communication with the distributed end-to-end broadband transport network, a network access server platform (NASP), the NASP connected to and in communication with the BAA and the switch, the NASP provides personalized network access and services on demand and a call connection agent (CCA) to complete a call placed by the user to a terminating user.

10 Claims, 1 Drawing Sheet

(56) References Cited

U.S. PATENT DOCUMENTS

| | | | |
|---|---|---|---|
| 6,353,737 B1 | 3/2002 | Herzog | |
| 6,381,315 B1* | 4/2002 | Nhaissi | 379/111 |
| 6,490,450 B1* | 12/2002 | Batni et al. | 455/433 |
| 6,584,312 B1 | 6/2003 | Morin et al. | |
| 6,661,785 B1* | 12/2003 | Zhang et al. | 370/352 |
| 6,671,510 B1 | 12/2003 | Kelly et al. | |
| 6,704,396 B2 | 3/2004 | Parolkar et al. | |
| 6,742,036 B1 | 5/2004 | Das et al. | |
| 6,785,256 B2 | 8/2004 | O'Neill | |
| 6,804,225 B1* | 10/2004 | Lang | 370/352 |
| 6,804,533 B1 | 10/2004 | Makinen | |
| 6,853,648 B1 | 2/2005 | Krstanovski et al. | |
| 6,856,598 B1* | 2/2005 | Stanfield | 370/235 |
| 6,920,487 B2* | 7/2005 | Sofer et al. | 709/218 |
| 6,968,193 B2 | 11/2005 | Van Loon et al. | |
| 6,970,871 B1 | 11/2005 | Rayburn | |
| 7,016,677 B2 | 3/2006 | Fukasawa et al. | |
| 7,039,037 B2 | 5/2006 | Wang et al. | |
| 7,058,413 B2 | 6/2006 | Lin et al. | |
| 7,062,265 B1 | 6/2006 | Chang et al. | |
| 7,093,006 B2 | 8/2006 | Sanjeev et al. | |
| 7,096,015 B2 | 8/2006 | Bridges et al. | |
| 7,181,441 B2 | 2/2007 | Mandato et al. | |
| 7,184,415 B2 | 2/2007 | Chaney et al. | |
| 7,222,192 B2 | 5/2007 | Allison et al. | |
| 7,274,683 B2 | 9/2007 | Segal | |
| 7,334,038 B1* | 2/2008 | Crow et al. | 709/227 |
| 7,342,919 B2* | 3/2008 | Zhang et al. | 370/352 |
| 7,433,682 B1 | 10/2008 | Moll et al. | |
| 7,496,102 B2 | 2/2009 | Chow et al. | |
| 7,519,172 B2* | 4/2009 | Bruening et al. | 379/221.12 |
| 7,792,053 B1* | 9/2010 | Chow et al. | 370/254 |
| 7,796,538 B1* | 9/2010 | Chow et al. | 370/254 |
| 8,041,782 B1* | 10/2011 | Crow et al. | 709/220 |
| 2001/0006519 A1 | 7/2001 | Voit | |
| 2001/0031635 A1 | 10/2001 | Bharatia | |
| 2002/0055351 A1 | 5/2002 | Elsey et al. | |
| 2002/0077158 A1* | 6/2002 | Scott | 455/567 |
| 2002/0101880 A1 | 8/2002 | Kim | |
| 2002/0102973 A1 | 8/2002 | Rosenberg | |
| 2002/0118800 A1 | 8/2002 | Martinez et al. | |
| 2002/0154755 A1 | 10/2002 | Gourraud | |
| 2002/0173307 A1 | 11/2002 | Salmivalli et al. | |
| 2003/0005034 A1 | 1/2003 | Amin | |
| 2003/0035409 A1 | 2/2003 | Wang et al. | |
| 2003/0048792 A1 | 3/2003 | Xu et al. | |
| 2003/0054809 A1 | 3/2003 | Bridges et al. | |
| 2003/0157942 A1 | 8/2003 | Osmo | |
| 2003/0185203 A1 | 10/2003 | Chow et al. | |
| 2003/0223403 A1* | 12/2003 | Higgins | 370/352 |
| 2003/0228869 A1 | 12/2003 | Chow et al. | |
| 2004/0003058 A1 | 1/2004 | Trossen | |
| 2004/0258220 A1* | 12/2004 | Levine et al. | 379/88.23 |
| 2005/0113113 A1 | 5/2005 | Reed | |

OTHER PUBLICATIONS

U.S. Official Action dated Aug. 30, 2006 in U.S. Appl. No. 10/163,500.
U.S. Official Action dated Aug. 1, 2006 in U.S. Appl. No. 10/163,501.
U.S. Official Action dated Mar. 6, 2007 in U.S. Appl. No. 10/163,501.
U.S. Official Action dated Apr. 1, 2008 in U.S. Appl. No. 10/163,501.
U.S. Notice of Allowance and Allowability dated Oct. 14, 2008 in U.S. Appl. No. 10/163,501.
U.S. Official Action dated Aug. 23, 2006 in U.S. Appl. No. 10/189,776.
U.S. Official Action dated Jan. 24, 2007 in U.S. Appl. No. 10/189,776.
U.S. Official Action dated Jun. 11, 2007 in U.S. Appl. No. 10/189,776.
U.S. Official Action dated Dec. 5, 2007 in U.S. Appl. No. 10/189,776.
U.S. Official Action dated Jun. 16, 2008 in U.S. Appl. No. 10/189,776.
U.S. Official Action dated Mar. 3, 2009 in U.S. Appl. No. 10/189,776.
U.S. Official Action dated Jul. 24, 2009 in U.S. Appl. No. 10/189,776.
U.S. Official Action dated Dec. 4, 2009 in U.S. Appl. No. 10/189,776.
U.S. Notice of Allowance and Allowability dated Apr. 19, 2010 in U.S. Appl. No. 10/189,776.
U.S. Official Action dated May 6, 2009 in U.S. Appl. No. 11/743,750.
U.S. Official Action dated Nov. 23, 2009 in U.S. Appl. No. 11/743,750.
U.S. Notice of Allowance and Allowability dated Apr. 22, 2010 in U.S. Appl. No. 11/743,750.
Liao, Wanjiun, "Mobile Internet Telephony: Mobility Extensions to H.323," IEEE, Nov. 2001, pp. 1403-1414.
Liao, Wanjiun, "Mobile Internet Telephony: Mobility Extensions to H.323," IEEE, 1999, pp. 12-19.
Mohammed Zaid, "Personal Mobility in PCS," 1994 IEEE Personal Communications; pp. 12-16.
U.S. Appl. No. 10/189,776, filed Jul. 8, 2002, entitled System for Accessing End-to-End Broadcast Network via Network Access Server Platform, Inventors Chow, et al.
U.S. Appl. No. 11/743,750, filed May 3, 2007, entitled "System for Accessing End-to-End Broadband Network via Network Access Server Platform," Inventors: Chow et al.
U.S. Appl. No. 12/391,127 Office Action dated Sep. 13, 2011.
U.S. Appl. No. 12/391,127 Office Action dated Mar. 29, 2012.
U.S. Appl. No. 12/391,127 Office Action dated Oct. 5, 2012.
U.S. Appl. No. 12/391,127 Office Action dated Aug. 5, 2013.
U.S. Appl. No. 12/391,127 Office Action dated Apr. 1, 2014.

* cited by examiner

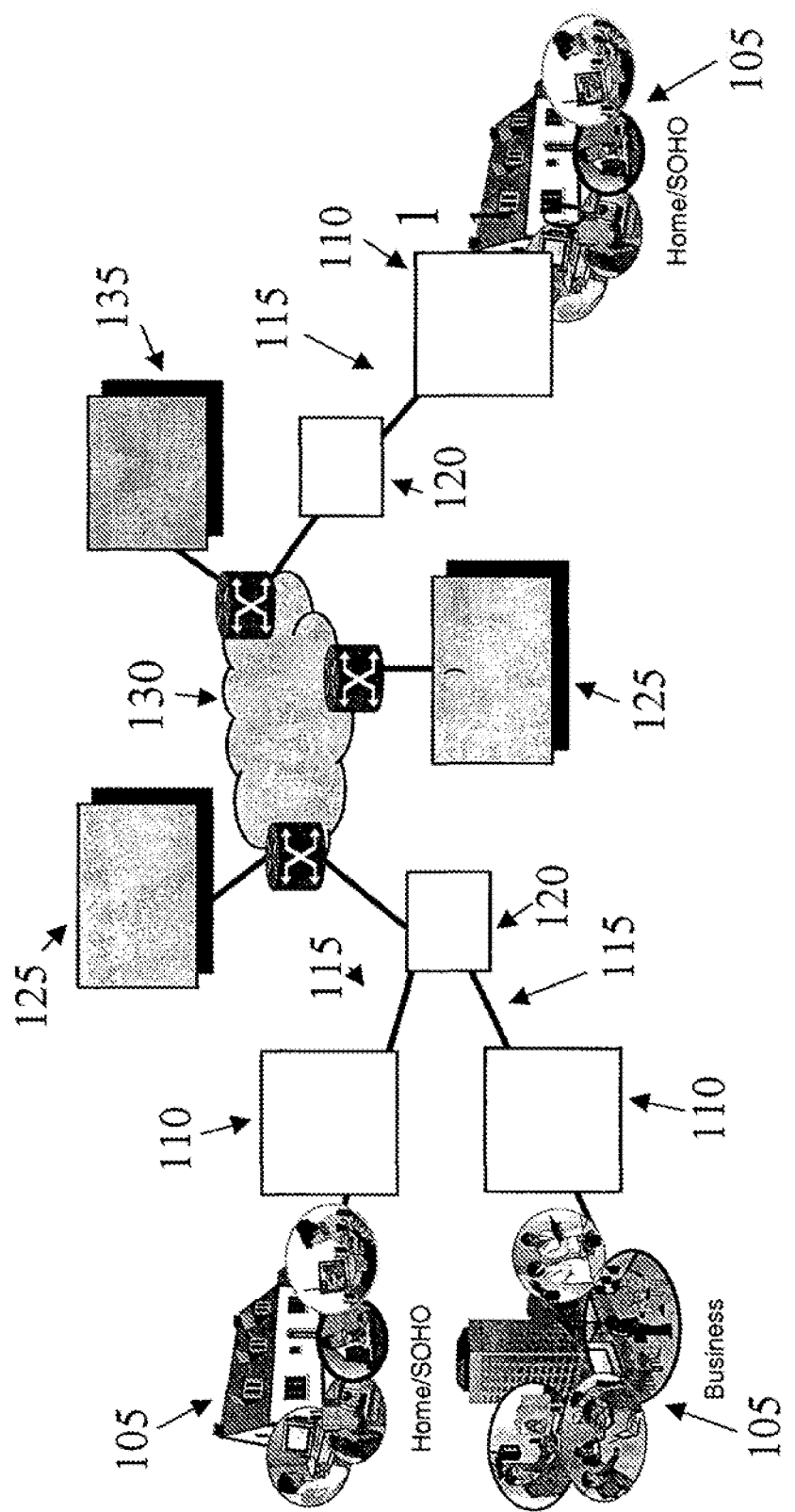

METHODS FOR ACCESSING END-TO-END BROADBAND NETWORK VIA NETWORK ACCESS SERVER PLATFORM

RELATED APPLICATIONS

This present application is a Continuation Application of and claims priority to U.S. patent application Ser. No. 10/189,776, now U.S. Pat. No. 7,792,053, entitled "System for Accessing End-to-End Broadband Network Via Network Access Server Platform", filed on Jul. 8, 2002, and is herein incorporated by reference in its entirety. This present application is related to U.S. patent application Ser. No. 10/163,500, entitled "Providing Mobility in a Distributed End-to-End Packet/Cell/Frame Network", by Albert Chow et al., which was filed on Jun. 7, 2002, and is now abandoned and U.S. Pat. No. 7,496,102, entitled "Broadband Telecommunication Service with Personalized Service Capability for Mobile Terminals", by Albert Chow, which was filed on Jun. 7, 2002, each of which is herein incorporated by reference in its entirety.

FIELD OF THE INVENTION

The present invention relates generally to the field of telecommunications and specifically to a personalized system and method for accessing a broadband network via a network access server platform (NASP).

BACKGROUND OF THE INVENTION

Telecommunications have evolved from plain old telephone service (POTS) using a conventional wired line telephone and keypad. Circuit switched telecommunications have evolved from circuit-switched to end-to-end broadband packet/cell/frame networks. This evolution has enabled new services and new means of communication. In a true end-to-end broadband packet/cell/frame network environment, the use of traditional circuit-switch facilitated dial tone and numbering scheme (i.e., Directory Number (DN), E.164) as a method for establishing a link to someone is no longer applicable. Users/customers/subscribers now expect easier telecommunications access as well as substantially more services. Users will have voice prompted greetings from an access network based system/service after a telephone/telecommunication device goes "off-hook", where users will utilize unique personal identifiers comparable to the email address format (e.g., anyone@provider.com).

SUMMARY OF THE INVENTION

The present invention is applicable to current and future subscribers and integrates a service provider's residential and business services and a service provider's broadband transport network to provide personalized end-to-end packet/cell/frame based services.

The system and method described herein provides enhanced end-to-end packet telephony and conventional telecommunication services with distributed end-to-end packet network environments. Since the broadband transport methodology is irrelevant to the overall NASP service concepts, the Asynchronous Transfer Mode (ATM) with cell based transport, frame relay network and all transport methodology from the resident, business and small office/home office (SOHO) environments are all examples of underlying transport technologies and should be considered as exemplary broadband transport networks.

The emerging broadband (i.e., up to T1+rate) access from the home/business (via for example, cable/hybrid fiber coax (HFC) and generic digital subscriber line (xDSL)) environments facilitates a variety of new services including integrated packet voice, data, and multimedia applications. These advanced multimedia services/applications require a sophisticated user-to-network interaction to fulfill and communicate all the service criteria, and the simplicity of the conventional telephone keypad cannot fulfill these needs. New multi-modal user interfaces, such as speech/voice recognition, will enable the user/consumer to interact with the network in a more human/natural and sophisticated manner.

Personalized network access to a broadband network is achieved through the use of a NASP, which is a network centric service element that interfaces between a network access entity (e.g., BAA), a content service provider and service providers network. End users are enabled to access network services though procedures other than via conventional telephone access methods such as a keypad, etc. The NASP controls many access procedures such as voice access, network signaling, integrating various generations of services and procedures and the integration of various network technologies. Examples of personalized network access include a voice greeting to a user after a telephone/telecommunication device goes "off-hook", asking what service the user needs, adding/modifying/removing and generally maintaining a personal address book for the user's contacts, maintaining various user-specific databases such as preferred calling plans, placing calls to contacts maintained in the user's personal address book, forwarding calls, screening calls and locating the most inexpensive calling plan for placing a call. All interactions with the network are via voice communications.

It is, therefore, an object of the present invention to provide personalized network access to an end-to-end broadband packet/cell/frame network using the Network Access Server Platform.

BRIEF DESCRIPTION OF THE DRAWINGS

The invention is best described with reference to the detailed description and the following FIGURE, where:

FIG. 1 shows an exemplary embodiment of an end-to-end broadband network including the NASP of the present invention.

DETAILED DESCRIPTION OF THE PREFERRED EMBODIMENTS

The Network Access Server Platform (NASP) is a network centric service element that provides interworking functions between a network access entity(s), a content services provider(s) and a service provider's broadband packet/cell/frame network to facilitate services and applications. The NASP provides end users, in either residential, small office/home office (SOHO), business or public environments, the means to access the network centric services, the procedures that locate and deliver services, and the methodologies that allow the introduction of advanced services in a distributed intelligent manner by a service provider. Subscribers can customize their telecommunication needs, such as service and feature selections, maintenance of personal address books and directories, profiles and databases, and service preferences, etc. simply by programming the NASP anywhere and anytime. The NASP assists the subscriber in accessing telecommunication services via a service provider's broadband packet/cell/frame network, and the NASP replaces the conventional dial tone and telephone keypad with technologies such as speech coding, interactive voice, voice recognition and text-to-speech conversion. When the user wishes to request a telecommunication service, he/she picks up the telephone/telecommunications device, or turns on a laptop/PC, or initiates the NASP application. The user will interact with the NASP instantaneously/directly via the premises-based Broadband Access Agent (BAA) to fulfill, initiate and terminate the service requests in multi-session and multi-application scenarios. The NASP, based on the behavior of the user, interacts with the service provider's broadband packet/cell/frame network and the BAA to deliver network centric or content service provider's services to the end-users.

Each user can program the NASP via a web-based service management dialogue or through an interactive voice session supported by the NASP via BAA, and the NASP provides personalized services to the user on demand. In an exemplary embodiment, the NASP can be programmed via a web-based dialogue box or pull-down manual after the user logs onto the service (i.e., turn on the laptop, PDA etc.). The dialogue box or pull-down manual can be installed as part of a service initialization process, for instance from a CD issued by the service provider to the broadband service user/subscriber. In turn, the user will install the dialogue software onto their choice of communications devices including stationary PC, laptop, PDA etc. The pull-down manual/dialogue will allow the user/subscriber to program their service preferences and personal profile, which will, in turn, be transmitted to the NASP via the BAA. NASP also eliminates the necessity of consumers programming each of their communication devices with their preferences.

For a service provider, the NASP provides network access control functions and acts as a broker-agent to provide the bridge that links a service provider broadband packet/cell/frame network and its network centric services to the end user. In addition, the NASP supports network related security management including services such as the subscriber authentication; services authorization; call session control; billing and accounting; subscriber identity related naming and directory services; and mobility management (e.g., terminal, session, personal, service, and number portability) for the end-users. For example, a user may carry their telecommunication device to another location and connect to a telecommunication jack at the new location. Once connected to the telecommunication jack powering the telecommunication device on the BAA at the new location will recognize the telecommunication device and signal the NASP accordingly to retrieve the personalized databases and provide the user with their personalized services. For network simplicity and distribution of network intelligence, the NASP partitions services from network control/transport and in turn, reduces deployment costs effectively. Furthermore, the distributed network intelligence that NASP promotes provides flexible and efficient network centric service creation, services upgrades, and optimally provides best quality of service (QoS) to the users.

An exemplary embodiment depicted in FIG. 1 comprises a distributed network centric network where a user operating from a business, home or SOHO 105 is connected to a premises-based BAA 110. The BAA 110 provides the intelligence and forms a part of the service provider's media specific equipment at the customer site. In an exemplary embodiment, the BAA 110 would form a part of a cable or xDSL modem provided to a user by the service provider. BAA 110 is connected to a switch 120 via any one of a number of underlying network control/transport technologies. Depicted in FIG. 1 is xDSL 115 using an IP DSL switch 120. The underlying network control/transport services may be provided by ATM, HFC, etc. using a corresponding compatible switch. Switch 120 (which may be, for example, an IP DSL switch) is connected to NASP 125 which acts as an agent/broker for services and features requested and subscribed to by a user. Switch 120 is a soft switch, which, for example, is using an xDSL media and separates voice from data. NASP 125 interworks with broadband transport network 130. NASP 125 interworks with BAA 110 to establish the call with a previous caller designated network Call Connection Agent (CCA) 135 to complete the call via broadband transport network 130. The CCA 135 is responsible for authentication, authorization and accounting, and may be integrated with the NASP 125. The NASP 125 is connected to the user via the premises based BAA 110, a switch 120 and the broadband transport network 130 via the internet. The NASP 125 is like a 5ESS switch but is packet switched rather than circuit switched and is intended to provide similar but enhanced services, as will be described herein. The NASP 125 functions above the network control/transport layer and provides the personalized services described herein via an interface to the broadband transport network 130. The NASP 125 provides services users are already familiar with and want such as call forwarding, caller identification, etc. Multiple content service providers (CSPs) (not shown) are also connected to and in communication with the distributed end-to-end broadband transport network 130 and provide personalized services to a user via the NASP 125.

Examples of the NASP 125 Usage:
1. John picks up his telephone (e.g., POTS, ISDN, and Internet telephony protocol) or turns on his laptop/PDA, etc.
2. John's BAA 110 initiates signaling communication to John's designated NASP 125, which sends a voice greeting to John; "AT&T, John, may I help you?"
3. John voices his request to his designated NASP 125 to call his friend Mary, and John's designated NASP 125 responds with "Thank you and please wait."
4. John's designated NASP 125 will retrieve Mary's destination address from John's personal directory database (e.g., John's address book) maintained by John's designated NASP 125. Mary's destination address may be in the form of mary@att.com, or 555 1212@, verizon.com. John's designated NASP 125 places a call to Mary.
5. John's designated NASP 125 will interwork with John's BAA 110 to establish the call with a previous caller designated network Call Connection Agent 135 to complete the call to Mary. John instructs NASP 125 to forward all calls from Mary to his wireless telephone.
6. Mary's NASP 125 will interwork with Mary's BAA 110 to decide how to terminate the incoming call, for instance:
   a. Switch call to voicemail
   b. Route call to Mary's remote location
   c. Answer the call, etc.
7. Upon call termination, both NASPs 125 generate call detail records and send copies to the CCA 135 and/or a designated billing center/clearinghouse.

Additionally, the following are also possible instructions John may give his designated NASP 125. John instructs his designated NASP 125 to add/remove entries from his address book. John instructs his designated NASP 125 to place an international call using the most inexpensive calling plan that is currently offered by the service providers. John's designated NASP 125 will screen all incoming calls to check disposition status based on John's instructions, e.g., complete the call, forward the call to voicemail, or reject the call.

The key features of the NASP 125 of the present invention are to provide a distributed network centric service architecture within a broadband packet/cell/frame network; to provide the procedures and methods to manage mobility for terminal, personal, session and services and numbering; to provide the signaling and messages necessary for services between the NASP 125 and the user end-equipment (e.g., telephone, laptop, PDA etc.); to provide the signaling and messages necessary for services between a service provider network and the NASP 125; to support the services and call features among the NASP 125, user end equipment, and the service provider network; to provide the procedures and methods to integrate 2nd, 3d, and 4th generation wireless access technologies and services via the NASP 125; and to provide the procedures and methods that integrate wired broadband network access technologies including cable, xDSL etc. via the NASP 125.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What we claimed is:

1. A method for providing personalized network access and services to a telecommunication device, the method comprising:
   determining, by a broadband access agent at a location, that the telecommunication device is connected to a power source at the location, wherein the telecommunication device is associated with a premise-based broadband access agent at a premise location different from the location;
   in response to the telecommunication device connecting to the power source at the location,
      identifying, by the broadband access agent, the telecommunication device, and
      signaling, by the broad access agent, a network access server platform to retrieve information regarding personalized services associated with the telecommunication device;
   receiving, at the network access server platform via the broadband access agent, an indication from a user associated with the telecommunication device to establish an interactive voice session with the telecommunication device, wherein the indication comprises the telecommunication device being taken off-hook;
   in response to receiving the indication and without further action from the user, establishing, by the network access server platform, the interactive voice session with the telecommunication device;
   after establishing the interactive voice session with the telecommunication device, receiving, at the network access server platform from the telecommunication device, a request for a personalized service of the personalized services, the request for the personalized service from the telecommunication device comprising a verbal request from the user associated with the telecommunication device to place an international call using a least expensive calling plan offered; and
   in response to receiving the verbal request from the user associated with the telecommunication device,
      locating, by the network access server platform, the least expensive calling plan for placing the international call, and
      placing, by the network access server platform, the international call using the least expensive calling plan.

2. The method of claim 1, further comprising generating call detail records of the international call.

3. The method of claim 1, further comprising:
   after establishing the interactive voice session with the telecommunication device, receiving, via the interactive voice session, instructions for disposing of an incoming communication to the telecommunication device, wherein the instructions for disposing of an incoming communication comprise either completing the incoming communication to the telecommunication device, forwarding the incoming communication to voicemail associated with the telecommunication device, or rejecting the incoming communication based on the incoming communication; and
   screening an incoming communication to the telecommunication device to determine how to dispose of the incoming communication based on the instructions.

4. The method of claim 1, further comprising maintaining an address book, a directory, a profile, and a service preference associated with the telecommunication device.

5. The method of claim 1, further comprising providing a voice greeting to the user of the telecommunication device in response to receiving the indication.

6. A method for providing personalized network access and services to a telecommunication device, the method comprising:
   determining, by a broadband access agent at a location, that the telecommunication device is connected to a power source at the location, wherein the telecommunication device is associated with a premise-based broadband access agent at a premise location different from the location;
   in response to the telecommunication device connecting to the power source at the location,
      identifying, by the broadband access agent, the telecommunication device, and
      signaling, by the broad access agent, a network access server platform to retrieve information regarding personalized services associated with the telecommunication device;
   receiving, at network access server platform via the broadband access agent, an indication from a user associated with the telecommunication device to establish an interactive voice session with the telecommunication device, wherein the indication comprises the telecommunication device being powered on;
   in response to receiving the indication and without further action from the user, establishing, by the network access server platform, the interactive voice session with the telecommunication device;
   after establishing the interactive voice session with the telecommunication device, receiving, at the network access server platform from the telecommunication device, a request for a personalized service of the personalized services, the request for the personalized service from the telecommunication device comprising a verbal request from the user associated with the telecommunication device to place an international call using a least expensive calling plan offered; and
   in response to receiving the verbal request,
      locating, by the network access server platform, the least expensive calling plan for placing the international call, and
      placing, by the network access server platform, the international call using the least expensive calling plan.

7. The method of claim 6, further comprising generating call detail records of the international call.

8. The method of claim 6, further comprising:
- after establishing the interactive voice session with the telecommunication device, receiving, via the interactive voice session, instructions for disposing of an incoming communication to the telecommunication device, wherein the instructions for disposing of an incoming communication comprise either completing the incoming communication to the telecommunication device, forwarding the incoming communication to voicemail associated with the telecommunication device, or rejecting the incoming communication based on the incoming communication; and
- screening an incoming communication to the telecommunication device to determine how to dispose of the incoming communication based on the instructions.

9. The method of claim 6, further comprising maintaining an address book, a directory, a profile, and a service preference associated with the telecommunication device.

10. The method of claim 6, further comprising providing a voice greeting to the user of the telecommunication device in response to receiving the indication.

\* \* \* \* \*